United States Patent [19]
Shoji

[11] Patent Number: 6,141,117
[45] Date of Patent: *Oct. 31, 2000

[54] IMAGE PROCESSING APPARATUS AND METHOD

[75] Inventor: Fumio Shoji, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/806,240

[22] Filed: Feb. 24, 1997

[30] Foreign Application Priority Data

Feb. 27, 1996 [JP] Japan .................................... 8-039857

[51] Int. Cl.$^7$ .................................................. H04N 1/04
[52] U.S. Cl. ........................... 358/474; 358/498; 358/496; 358/497; 358/444; 358/401; 358/296
[58] Field of Search .................................... 358/498, 497, 358/496, 401, 486, 494, 409, 296, 456, 459, 440, 434; 399/362, 363, 373, 361, 367

[56] References Cited

U.S. PATENT DOCUMENTS

| | | | |
|---|---|---|---|
| 5,041,874 | 8/1991 | Nishimori et al. | 399/203 |
| 5,084,741 | 1/1992 | Takemura et al. | 399/373 |
| 5,162,838 | 11/1992 | Inuzuka et al. | 358/440 |
| 5,359,431 | 10/1994 | Ng | 358/459 |
| 5,726,772 | 3/1998 | Parker et al. | 358/456 |

*Primary Examiner*—Cheukfan Lee
*Attorney, Agent, or Firm*—Fitzpatrick, Cella, Harper & Scinto

[57] ABSTRACT

There is provided an image processing apparatus comprises exposure unit for exposing original; read unit for reading original image exposed by the exposure unit, conversion unit for converting the read image, into binary data for one pixel, memory for storing the converted one-pixel binary data, record unit for recording image based on the read image, first reading mode in which the image on the original is read by the read unit, as the original is moved and the exposure unit is fixed, second reading mode in which the image on the original is read by the read unit, as the original is fixed and the exposure unit is moved, first recording mode in which the image read by the read unit is stored in the memory and then the stored image is read and recorded by the record unit, second recording mode in which the image read by the read unit is recorded by the record unit without storing the read image in the memory, selection unit for selecting either the first reading mode or the second reading mode, and control unit for performing control such that the image read by the read unit is recorded by the record unit in either the first recording mode or the second recording mode, in accordance with the reading mode selected by the selection unit, whereby effective process can be realized according to original reading method, so as to effectively use the memory.

19 Claims, 4 Drawing Sheets

IMAGE PROCESSING APPARATUS AND METHOD

BACKGROUND OF THE INVENTION

1. Field of the Invention

The present invention relates to image processing apparatus and method for recording and outputting an image on an original which has read.

2. Related Background Art

Conventionally, there has been known that an original image is copied or duplicated by using, e.g., a facsimile apparatus. In the conventional facsimile apparatus, a sheet-like original is set in an original feed unit, the original image is read by a read sensor such as a fixed contact sensor or the like with moving or feeding the original, and then the original is discharged (such an operation is referred as "sheet reading" hereinafter).

However, in such the operation, a book-like original could not be read. Therefore, in recent years, there has been known that a pressure board (or original cover) capable of being opened and closed is provided, the book-like original is placed on an original support plate, and then the original image can be read by the read sensor with moving the sensor (such an operation is referred as "book reading" hereinafter).

In any case, in a case where copy is performed by such apparatus, when single copying (to obtain a single copied matter or duplication from the single original) is performed, the read image is not once stored in a memory but is directly printed (such an operation is referred as "direct copy" hereinafter). On the other hand, when plural copying (to obtain a plurality of copied matters or duplicates from the single original) is performed, the read image is once stored in the memory and then the stored image is read from the memory a plurality of times corresponding to the designated number of copies to be printed (such an operation is referred as "memory copy" hereinafter).

However, the memory copy or the direct copy has been conventionally performed in accordance with the number of copies, irrespective of an image reading method. Therefore, e.g., in case of obtaining the plural number of copies from the book original, even if the original has been kept in place on the original support plate, the memory copy has been performed. As a result, there has been a drawback that efficiency in use of the memory is degraded.

SUMMARY OF THE INVENTION

An object of the present invention is to provide image processing apparatus and method which eliminated the above-described conventional drawback.

An another object of the present invention is to provide an image processing apparatus and method which can effectively utilize a memory.

An another object of the present invention is to provide an image processing apparatus and method which can increase a chance of giving a user high-quality image output.

An another object of the present invention is to provide an image processing apparatus and method which perform an effective process in accordance with an original reading method.

An another object of the present invention is to provide an image processing apparatus and method which can commonly perform processes in a plurality of modes.

The above and other objects of the present invention will become apparent from the following detailed description when read in conjunction with the accompanying drawings.

DETAILED DESCRIPTION OF THE PREFERRED EMBODIMENTS

Hereinafter, an embodiment of the present invention will be explained in detail with reference to the accompanying drawings.

Figure 1:
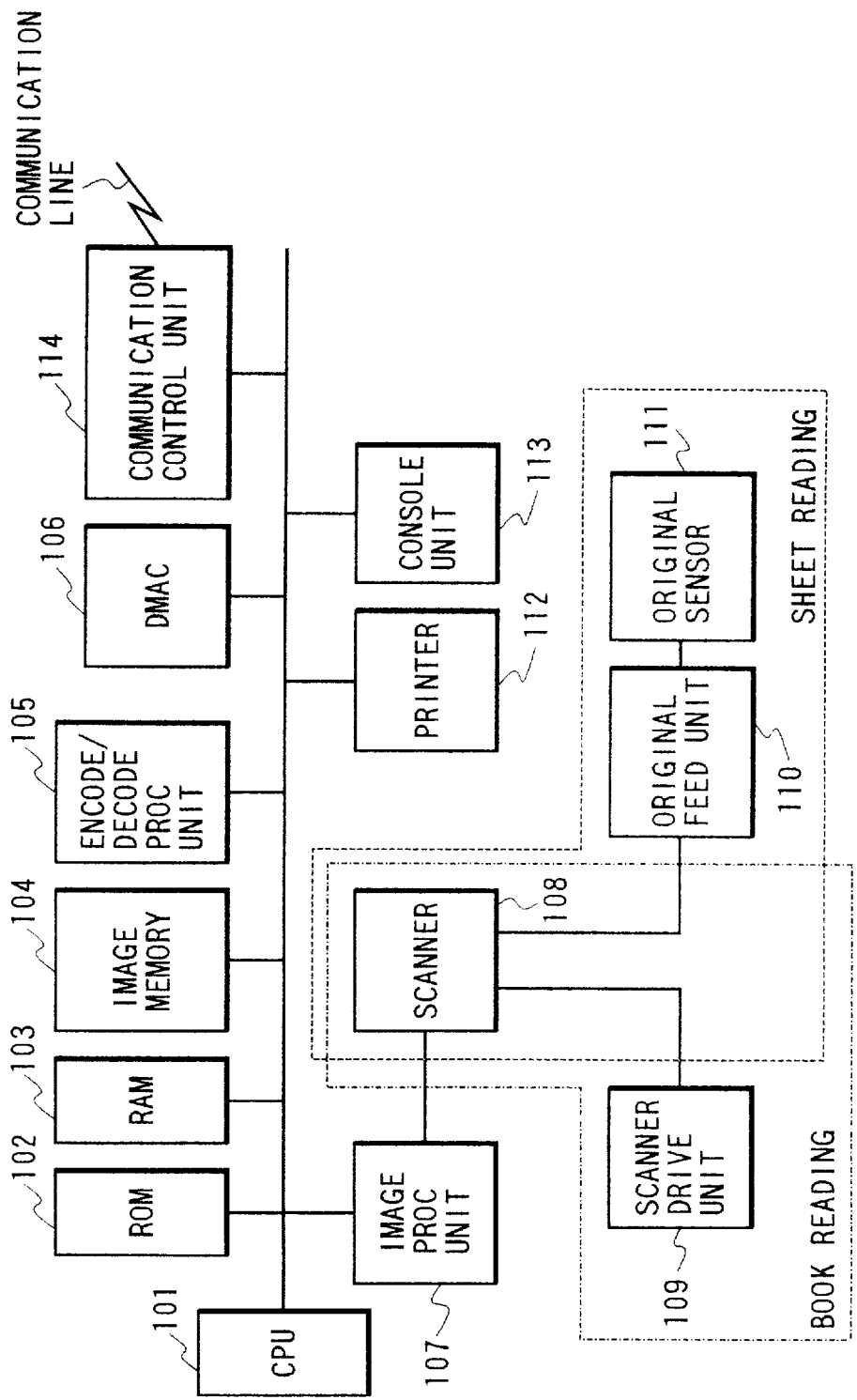
FIG. 1 is a block diagram showing the schematic structure of a facsimile apparatus according to an embodiment of the present invention.

FIG. 1 is a block diagram showing schematic structure of a facsimile apparatus according to the embodiment of the present invention.

A central processing unit (CPU) 101 is a system control unit which controls the facsimile apparatus as a whole.

A read only memory (ROM) 102 stores data or the like which represents a control program used by the CPU 101 for controlling the apparatus.

A random access memory (RAM) 103 which is composed of a static random access memory (SRAM) and the like stores a program control parameter or the like. Moreover, the RAM 103 stores a setting value registered by an operator, management data for the apparatus and the like, and also stores various working buffers.

An image memory 104 which is composed of a dynamic random access memory (DRAM) and the like stores image data.

An encode/decode process unit 105 performs encode and decode processes on the image data.

A direct memory access controller (DMAC) 106 performs data transfer between two memories and between a communication line and a memory.

A scanner 108 has a contact sensor (i.e., line sensor) or the like which is composed of a light emission element such as a light emitting diode (LED) or the like and a plurality of light reception elements such as phototransistors or the like for receiving a reflected light from an original. A reading light is irradiated onto the original by the light emission element, and then the reflected light is received by the light reception elements to obtain image data (e.g., having six-bit level) according to a density of the original image in units of one pixel. The image data read by the scanner 108 is subjected to various image processes by an image process unit 107 and is then output.

A scanner drive unit 109 moves the scanner 108 along an original support plate. In case of reading a book-like original, the original is placed on the original support plate, and the scanner 108 is moved by the scanner drive unit 109 to read the image on the original line by line.

An original feed unit 110 feeds placed or stacked sheet-like originals one by one such that the original is read by the scanner 108 (as the scanner 108 is kept fixed).

An original sensor 111 detects whether or not the original is set in the original feed unit 110.

A printer 112 records, on a recording sheet or paper, the image read by the scanner 108, the image received via the communication line, and the image stored in the image memory 104. The printer 112 forms the image on the basis of on and off states of a laser beam. In this case, by changing an irradiation time of the laser beam in accordance with a level of the input image data, a size of one pixel can be changed to emphasize gradationality or tonality of the printed image.

A console unit 113 which is composed of a liquid crystal display (LCD), a keyboard and the like displays various messages and is used by the operator to perform various input operation.

A communication control unit 114 performs various control in a case where the image data read by the scanner 108 is transmitted via the communication line (e.g., public switched telephone network (PSTN) or the like), and in a case where the image data is received via the communication line.

The facsimile apparatus shown in FIG. 1 has a memory copy mode and a direct copy mode, as copy modes. In the memory copy mode, the image data which has been read by the scanner 108 is converted into binary data for one pixel by the image process unit 107, the obtained binary data is subjected to compression encoding by the encode/decode process unit 105, and then the encoded data is stored in the image memory 104. After that, the image data is read from the image memory 104, the read data is decoded by the encode/decode process unit 105, and then the decoded data is printed by the printer 112. On the other hand, in the direct copy mode, the image data which is multivalue data for one pixel and has been read by the scanner 108 is transferred to the printer 112 as it is, and then the transferred data is printed.

Further, the facsimile apparatus can perform the copy operation and the operation that the image data stored in the image memory 104 is transmitted via the communication line, in parallel. On the other hand, the facsimile apparatus can perform the copy operation and the operation that the image data received via the communication line is stored in the image memory 104, in parallel.

Figure 2:
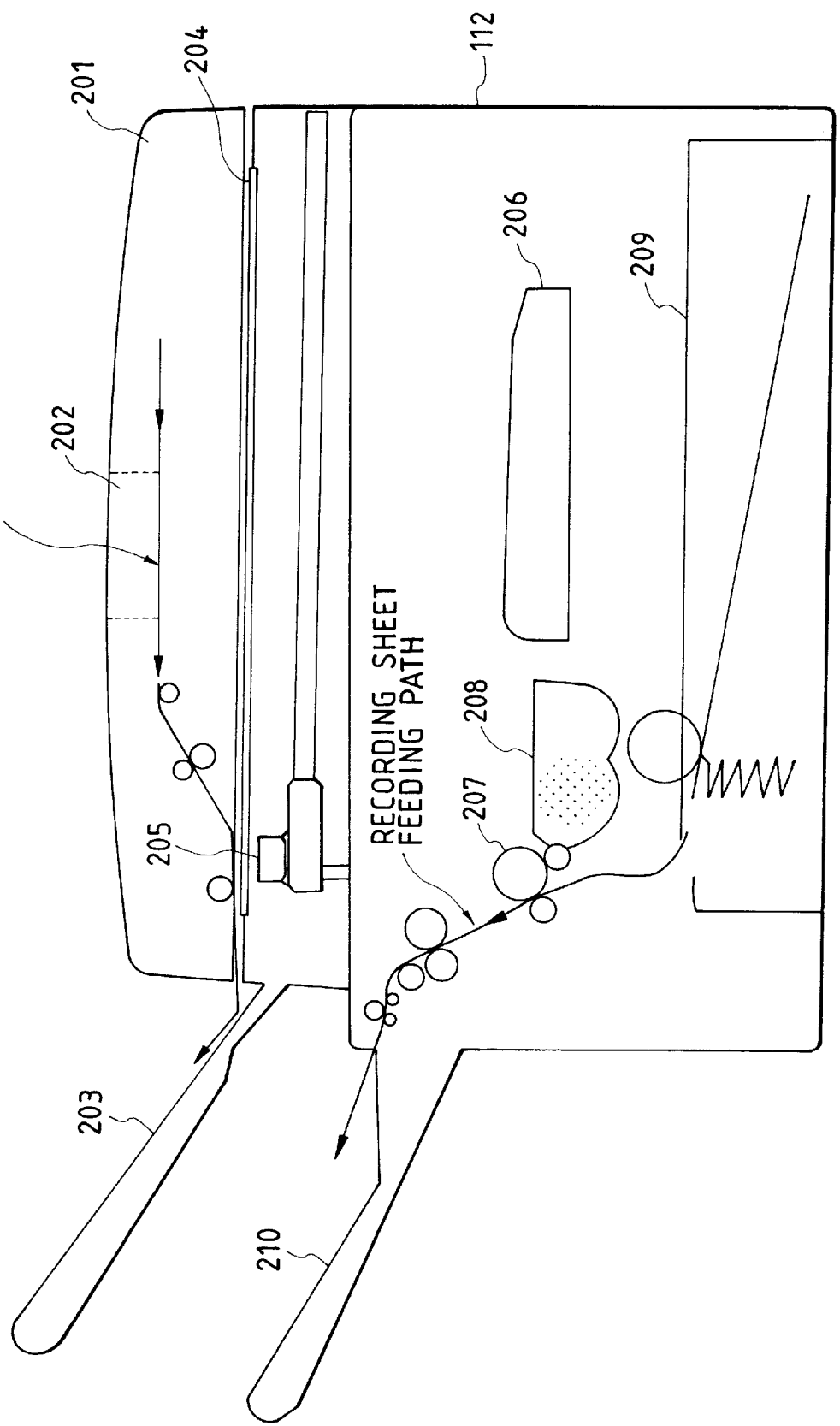
FIG. 2 is a sectional view showing the facsimile apparatus according to the embodiment of the present invention.

FIG. 2 is a sectional view showing the facsimile apparatus in FIG. 1.

Reference numeral 201 denotes an original supply unit which is composed of the original feed unit 110, the original sensor 111 and the like. The operator places or stacks the sheet-like original on the original supply unit 201, and sets a slider 202 such that the slider 202 coincides with a width of the original. Then, if the operator instructs the console unit 113 to read the original, the placed original is fed one by one along a sheet-like original reading and feeding path to be discharged to an original discharge tray 203. The original supply unit 201 also acts as a pressure board capable of being opened and closed, to press the original placed on an original glass plate 204.

Reference numeral 205 denotes a contact sensor. Usually, the contact sensor 205 is being fixed at a position shown in FIG. 2 to read the image on the original which is fed by the original supply unit 201. In case of performing the book reading, the image on the original placed on the original glass plate 204 is read, as the contact sensor 205 is moved by the scanner drive unit 109.

Reference numeral 206 denotes a laser unit which irradiates a laser beam in accordance with the input image data, to form a latent image on a photosensitive drum 207. Then, a toner is attached to the photosensitive drum 207 by a development unit 208, whereby the toner is transferred to a recording sheet or paper which is supplied from a sheet (or paper) cassette 209. The recording sheet is fed along a recording sheet feeding path, whereby the toner is fixed to the sheet. Therefore, the image is recorded on the recording sheet, and then the sheet is discharged to a recording sheet (or paper) discharge tray 210.

Figure 3:
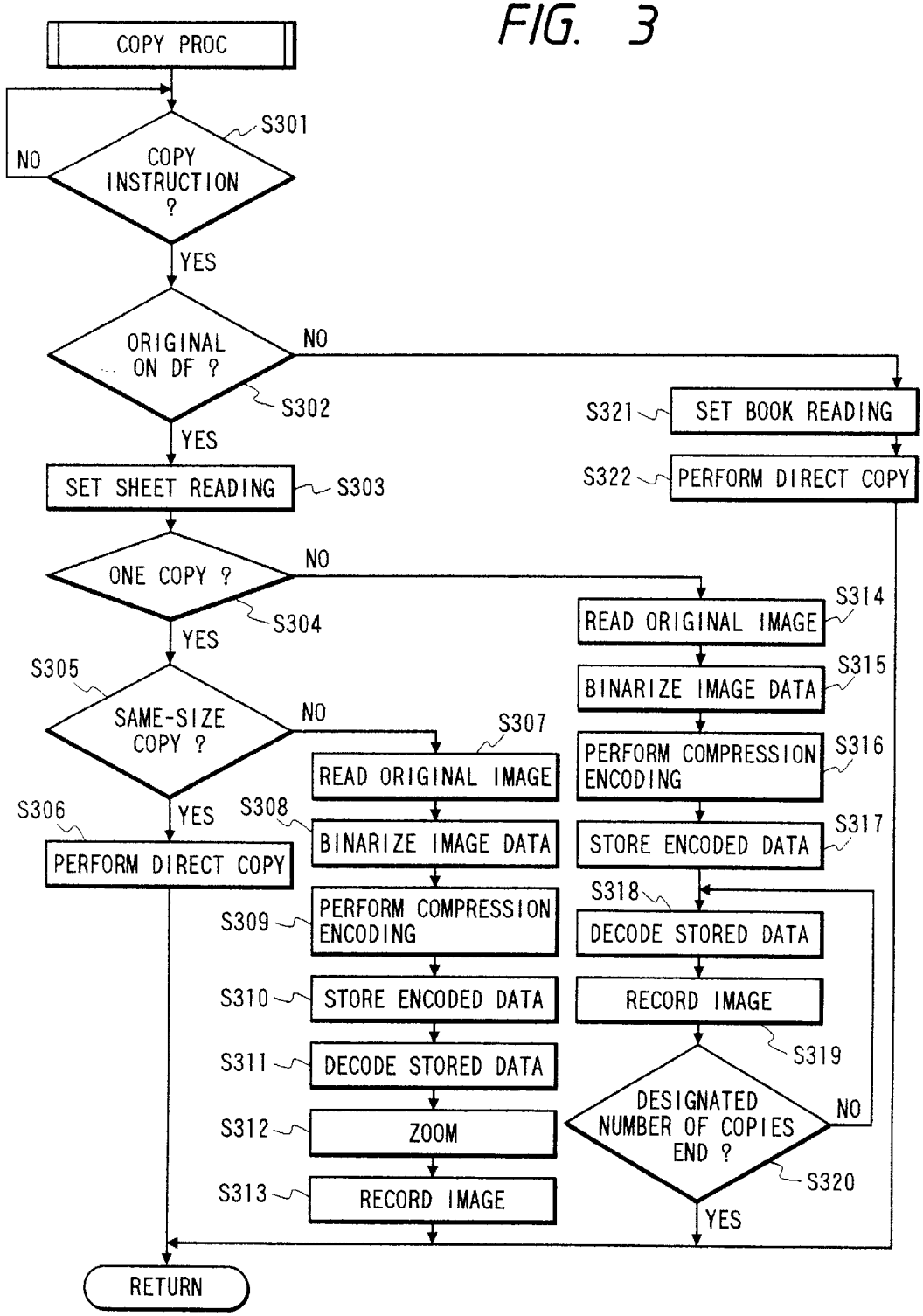
FIG. 3 is a flowchart showing a flow of a copy process.

FIG. 3 is a flow chart showing processing in case of copying the original. The flow chart represents the process which is controlled by the CPU 101 on the basis of the program stored in the ROM 102.

Initially, in a step S301, if the operator instructs performing the copying by using the console unit 113 (in this case the number of copies, copy magnification and the like are also instructed), the flow advances to a step S302 to judge by the original sensor 111 whether or not the original is being placed on the original supply unit (DF) 201. If the original is being placed, the flow advances to a step S303 to perform setting for the sheet reading.

Then, in a step S304, the designated number of copies is checked. If the single copy has been designated, the flow advances to a step S305 to check the copy magnification. In this case, if a same-size (i.e., 100%) copy has been designated, the flow advances to a step S306 to perform the direct copy by the sheet reading. That is, the image on the original is sequentially read one by one by the contact sensor 205 of the scanner 108, as the original is fed by the original feed unit 110 provided in the original supply unit 201. In this case, the obtained multivalue image data for one pixel is transferred to the printer 112, and then a period of time during which the laser beam is irradiated from the laser unit 206 is varied in accordance with a level of the image data, to form and print the image on the recording sheet. Thus, a high-quality image having the gradationality or tonality for each pixel can be obtained.

On the other hand, if it is judged in the step S305 that the copy magnification is not the same-size copy, the flow advances to a step S307 to perform the memory copy. In the step S307, the image on the original is read by the sheet reading, and in a step S308 the read multivalue image data for one pixel is binarized by the image process unit 107. Subsequently, after the binarized image data is subjected to compression encoding by the encode/decode process unit 105 in a step S309, the obtained image data is stored in the image memory 104 in a step S310. Subsequently, after the data which has been stored in the image memory 104 is read and decoded by the encode/decode process unit 105 in a step S311, image zooming is performed by, e.g., thinning, interpolating the image data in accordance with the copy magnification in a step S312. Thus, the image is output to be recorded on the recording sheet (or paper) by the printer 112 in a step S313. In this case, since the image data is the binary data for one pixel, the printer 112 performs the image recording by turning on or off a dot.

Further, if it is judged in the step S304 that plural copying has been designated, the flow advances to a step S314 to perform the memory copy. In this case, the processes in steps S314 to S318 are respectively the same as those in the steps S307 to S311. Then, in a step S319, the decoded binary image data for one pixel is recorded on the recording sheet by the printer 112. However, in case of zooming the image, such the zooming is performed in the same manner as that in the step S312. Subsequently, in a step S320, it is judged whether or not the designated number of copies terminated. That is, until the designated number of copies terminates, the process for reading the image data from the image memory 104 and recording the read image data on the recording sheet by the printer 112 is repeated.

Further, if it is judged in the step S302 that the original is not placed on the original supply unit 201, the flow advances to a step S321 to perform the setting for the book reading. Then, in a step S322, the direct copy is performed by the book reading. That is, the image on the original placed on the original glass plate 204 is read by the scanner 108, as the scanner 108 is moved by the scanner drive unit 109. Then, the image data is output to be recorded by the printer 112 as a multi-gradation image for one pixel on the basis of the read multilevel image data for one pixel. In case of the plural copying, the original is again read and recorded.

In any case, if the image data which has been stored in such a manner as that in the steps S307 to S310 and the steps S314 to S317 is transferred to the communication control unit 114, such the image data can be transmitted via the communication line.

Figure 4:
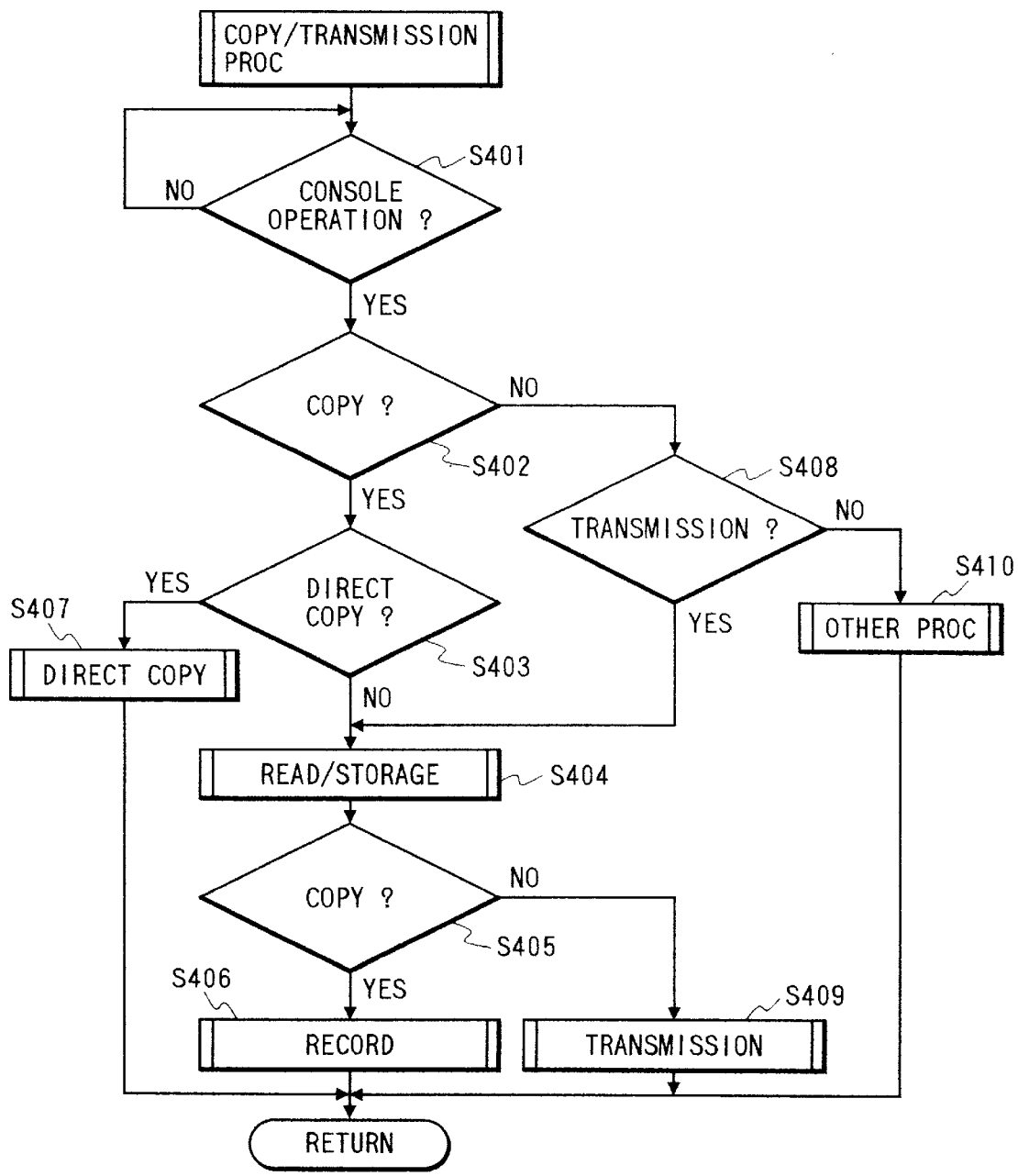
FIG. 4 is a flow chart showing flows of the copy process and a facsimile transmission process.

That is, such an operation can be performed on the basis of the process shown in a flow chart of FIG. 4. This flow chart represents a flow of the process which is controlled by the CPU 101 on the basis of the program data stored in the ROM 102.

Initially, in a step S401, it is judged whether or not the console unit 113 was operated by the operator. If the console unit 113 was operated, it is further judged in a step S402 whether or not such the operation is to instruct the copy. Then, in a step S403, if such the operation satisfies a condition that the direct copy is to be performed, the process of the direct copy is performed in a step S407 in such a manner as described above. On the other hand, if such the operation satisfies a condition that the memory copy is to be performed, the flow advances to a step S404. In the step S404, the process starting from the image reading to the data storing into the image memory 104 is performed in such a manner as that in the steps S307 to S310 and the steps S314 to S317.

Also, if it was judged in the step S402 that the operation is not to instruct the copy and also it is judged in a step S408 that facsimile transmission of the image data is being instructed, the process starting from the original image reading to the data storing in the image memory 104 is performed in the same manner as in case of the memory copy (i.e., in the same routine) in the step S404.

Then, in a step S405, it is judged whether the image data stored in the image memory 104 is used for the copy or for the transmission. If the image data is used for the copy, the flow advances to a step S406. In the step S406, the process starting from the image data reading from the image memory 104 to the data output onto the recording sheet is performed in such a manner as that in the steps S311 to S313 and the steps S318 to S320. On the other hand, if it is judged in the step S405 that the image data stored in the image memory 104 is used for the transmission, the flow advances to a step S409 to generate a call to a designated destination. In the step S409, the image data stored in the image memory 104 is transferred to the communication control unit 114, and the transferred image data is then transmitted via the communication line in accordance with ordinary facsimile transmission procedure.

In case of the transmission, the information or the like which represents the destination instructed by the console unit 113 is correlated with the image data stored in the image memory 104, and the correlated information is previously stored in the RAM 103.

As described above, according to the present embodiment, a chance of unconsciously giving the operator a high-quality copied image can be increased by the direct copy.

Further, in case of storing the image data in the image memory, since the data is subjected to the binarization and the compression encoding, a memory capacity can be saved. Therefore, even if the copy operation is performed in parallel with an another operation, occurrence of a situation that one of these operations is interrupted can be reduced. Furthermore, in case of transmitting the data via the communication line, since the process (starting from the original reading to the memory storing) can be commonly performed, structure of the apparatus can be simplified.

Furthermore, according to the present embodiment, there can be selected the optimal copying method in accordance with the reading method (i.e., book reading and sheet reading), the condition whether the single copying or the plural copying, or the condition of whether the same-size copy or not.

In case of zooming the image, if the image data is not stored in the memory but is subjected to the thinning and interpolating when a scanner driving speed is controlled and when the data is transferred to the printer 112, a chance of the direct copying can be further increased.

The flow chart shown in FIG. 3 is based on the program stored in the ROM 102. However, if the data representing such the program is stored in a memory medium such as a detachable optomagnetic disk or the like, such the data can be applied to an another apparatus capable of deciphering it.

The present invention can be applied to a system constructed by a plurality of equipments (e.g., host computer, interface equipment, reader, printer and the like) or can be also applied to an apparatus comprising a single equipment (e.g., copy machine, facsimile machine).

The invention employed by a method whereby program codes of software to realize the functions of the foregoing embodiments are supplied to a computer in an apparatus or a system connected to various devices so as to make the devices operative in order to realize the functions of the foregoing embodiments and the various devices are operated in accordance with the programs stored in the computer (CPU or MPU) of the system or apparatus is also included in the scope of the present invention.

In such a case, the program codes themselves of the software realize the functions of the foregoing embodiments and the program codes themselves and means for supplying the program codes to the computer, e.g., a memory medium in which the program codes have been stored construct the present invention.

As such a memory medium to store the program codes, for example, it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or in another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible with the spirit and scope of the appended claims.

What is claimed is:

1. An image processing apparatus comprising:
   exposure means for exposing an original;
   read means for reading an image on the original exposed by said exposure means;
   conversion means for converting the image read by said read means into binary data for one pixel;
   memory means for storing the one-pixel binary data converted by said conversion means;
   record means for recording an image based on the image read by said read means;
   a first reading mode in which the image on the original is read by said read means, as the original is moved and said exposure means is fixed;
   a second reading mode in which the image on the original is read by said read means, as the original is fixed and said exposure means is moved;
   a first recording mode in which the image read by said read means and converted into the binary data for one pixel is stored in said memory means and then the stored image is read and recorded by said record means;
   a second recording mode in which the image read by said read means is recorded by said record means as an image of multi-value data for one pixel without converting the read image by said conversion means into the binary data for one pixel and storing the converted image in said memory means;
   selection means for selecting either the first reading mode or the second reading mode; and
   control means for performing a control such that the image read by said read means is recorded by said record means in either the first recording mode or the second recording mode, controlling selection conditions for each of the first recording mode and the second recording mode, and controlling an image form to be recorded by said record means, in accordance with whether said selection means selects the first reading mode or the second reading mode.

2. An apparatus according to claim 1, further comprising an original feeder for feeding stacked sheet-like originals one by one, and discharging the original after reading the image on the original by said read means, and
   wherein, in said first reading mode, the original is moved by said original feeder to read the image on the original.

3. An apparatus according to claim 1, further comprising transmission means for transmitting the data stored in said memory means.

4. An apparatus according to claim 1, further comprising reception means for receiving image data, and
   wherein said memory means stores the image data received by said reception means.

5. An apparatus according to claim 1, wherein, in a case where said second reading mode is selected by said selection means, said control means performs the control such that the image is recorded in said second recording mode.

6. An apparatus according to claim 1, wherein, in a case where the image is recorded in said second recording mode, said record means changes a size of one pixel in accordance with a level of the image read by said read means, to perform the recording.

7. An apparatus according to claim 1, wherein said selection means selects whether said first reading mode or said second reading mode is selected in accordance with a setting way of the original to be read by said read means.

8. An image processing apparatus comprising:
   a read device for reading an image on an original;
   selection means for selecting an operation mode of said read device, wherein said selection means selects either a first reading mode or a second reading mode, wherein in the first reading mode the image is read by said read device as the original is moved, and wherein in the second reading mode the image is read by said read device as the original is fixed;
   output means for outputting image data obtained by reading the image with said read device; and
   control means for performing control such that a quality of an image represented by the image data output by said output means as binary or multi-value data for one pixel is made to be different in accordance with whether said selection means selects said first reading mode or said second reading mode.

9. An apparatus according to claim 8, wherein said selection means selects the operation method of said read device in accordance with a setting method of the original.

10. An apparatus according to claim 8, wherein said control means controls whether or not the image data obtained by reading the image with said read device is to be output to an image memory, in accordance with the selection by said selection means.

11. An apparatus according to claim 8, wherein, in a case where the image data obtained by reading the image with said read device is visibly output in a dot on/off manner in accordance with the selection by said selection means, said control means controls whether or not a dot size in case of dot-on state is varied on the basis of a level of the image data.

12. An apparatus according to claim 8, wherein said control means further performs the control such that the output method of said output means is made different on the basis of whether or not the image data obtained by reading the image with said read device is visibly output plural times.

13. An image processing method comprising the steps of:
    exposing an original by an exposing means;
    reading an image on the exposed original;
    converting the read image into binary data for one pixel;
    storing the converted one-pixel binary data in a memory;
    recording an image based on the read image;
    wherein in a first reading mode of the reading step, the image on the original is read as the original is moved and the exposure means is fixed, and
    wherein in a second reading mode of the reading step, the image on the original is read as the original is fixed and the exposure means is moved;
    wherein in a first recording mode, the read image converted into the binary data for one pixel is stored in the memory and then the stored image is read and recorded, and
    in a second recording mode, the read image is recorded as an image of multi-value data for one pixel without converting the read image into binary data for one pixel and storing the converted image in the memory;

selecting either the first reading mode or the second reading mode; and controlling such that the read image is recorded in either the first recording mode or the second recording mode and the selection conditions for each of the first recording mode and the second recording mode and the image form to be recorded are controlled in accordance with whether said first reading mode or said second reading mode is selected in the selecting step.

14. An image processing method comprising the steps of:

reading an image on an original;

selecting an operation method in the reading step wherein either a first operation mode or a second operation mode is selected, when the first operation mode is selected, the image is read as the original is moved and, when the second operation mode is selected, the image is read while the original is fixed;

outputting image data obtained by reading the image; and performing a control such that a quality of an image represented by the outputted image data as binary or multi-value data for one pixel is made to be different in accordance with whether the first operation mode or the second operation mode is selected in said selection step.

15. A computer readable program, stored in a storage medium for an image processing method, said method comprising:

an exposing step of exposing an original by an exposing means;

a reading step of reading an image on the exposed original;

a conversion step of converting the read image into binary data for one pixel;

a storing step of storing the converted one-pixel binary data in a memory;

a recording step of recording an image based on the read image;

a first reading mode step in said reading step in which the image on the original is read as the original is moved and the exposure means is fixed;

a second reading mode step in said reading step in which the image on the original is read as the original is fixed and the exposure means is moved;

a first recording mode step in said recording step in which the read image converted into the binary data for one pixel is stored in the memory and then the stored image is read and recorded;

a second recording mode step in the recording step in which the read image is recorded as an image of multi-value data for one pixel without converting the read image into binary data for one pixel and without storing the read image in the memory;

a selecting step of selecting either said first reading mode step or said second reading mode step; and a controlling step of controlling such that the read image is recorded using said first recording mode step or said second recording mode step and the selection conditions for each of said first recording mode step and said second recording mode step and the image form to be recorded are controlled in accordance with whether said first reading mode step or said second reading mode step has been selected in said selecting step.

16. A computer readable program, stored in a storage medium for an image processing method, said method comprising:

a read step of reading an image on an original by using a read device;

a selection step of selecting an operation mode of the read device wherein either a first operation mode or a second operation mode is selected, in the first operation mode, the image is read by the read device as the original is moved, and in the second operation mode, the image is read by the read device while the original is fixed;

an output step of outputting image data obtained by reading the image with the read device; and a control step of performing control such that a quality of an image represented by the image data output in said output step as binary or multi-value data for one pixel is made to be different in accordance with whether the first operation mode or the second operation mode is selected in said selection step.

17. A program according to claim 16, wherein in said selection step either a first reading method or a second reading method is selected, in the first reading method the image is read by the read device as the original is moved, and in the second reading method the image is read by the read device as the original is fixed.

18. A program according to claim 16, wherein in said selection step the operation method of the read device is selected in accordance with a setting method of the original.

19. A program according to claim 16, wherein it is controlled in said control step whether or not the image data obtained by reading the image with the read device is to be output to an image memory, in accordance with the selection in said selection step.

* * * * *

UNITED STATES PATENT AND TRADEMARK OFFICE
CERTIFICATE OF CORRECTION

PATENT NO. : 6,141,117

DATED : October 31, 2000

INVENTOR(S) : Fumio SHOJI

It is certified that error appears in the above-identified patent and that said Letters Patent is hereby corrected as shown below:

COLUMN 1:

Line 8, "has" should read --has been--;
Line 16, "referred" should read --referred to--;
Line 24, "referred" should read --referred to--;
Line 30, "referred" should read --referred to--;
Line 36, "referred" should read --referred to--;
Line 48, "provide" should read --provide an--;
Line 51, "An another" should read --Another--;
Line 54, "An another" should read --Another--;
Line 57, "An another" should read --Another--; and
Line 61, "An another" should read --Another--.

COLUMN 6:

Line 3, "an" should be deleted;
Line 24, "an" should be deleted;
Line 27, "be" should read --also--;
Line 28, "also" should read --be--; and
Line 60, "be also" should read --also be--.

UNITED STATES PATENT AND TRADEMARK OFFICE
CERTIFICATE OF CORRECTION

PATENT NO. : 6,141,117

DATED : October 31, 2000

INVENTOR(S) : Fumio SHOJI

It is certified that error appears in the above-identified patent and that said Letters Patent is hereby corrected as shown below:

COLUMN 10:

Line 34, "wherein" should read --wherein.--; and
Line 40, "wherein" should read --wherein,--.

Signed and Sealed this

Fifteenth Day of May, 2001

Attest:

NICHOLAS P. GODICI

Attesting Officer  Acting Director of the United States Patent and Trademark Office